United States Patent
Voss et al.

(10) Patent No.: US 11,704,851 B2
(45) Date of Patent: Jul. 18, 2023

(54) PERSONALIZED VIDEOS USING SELFIES AND STOCK VIDEOS

(71) Applicant: Snap Inc., Santa Monica, CA (US)

(72) Inventors: Jeremy Voss, Los Angeles, CA (US); Dallin Dyer, Saratoga Springs, UT (US)

(73) Assignee: Snap Inc., Santa Monica, CA (US)

( * ) Notice: Subject to any disclaimer, the term of this patent is extended or adjusted under 35 U.S.C. 154(b) by 36 days.

(21) Appl. No.: 16/884,169

(22) Filed: May 27, 2020

(65) Prior Publication Data

US 2021/0375016 A1    Dec. 2, 2021

(51) Int. Cl.
| | |
|---|---|
| *G06T 11/60* | (2006.01) |
| *H04L 51/04* | (2022.01) |
| *G06V 40/16* | (2022.01) |
| *H04L 51/52* | (2022.01) |
| *H04N 21/431* | (2011.01) |

(Continued)

(52) U.S. Cl.
CPC ............ *G06T 11/60* (2013.01); *G06F 3/005* (2013.01); *G06F 3/04842* (2013.01); *G06V 40/166* (2022.01); *G06V 40/174* (2022.01); *H04L 51/04* (2013.01); *H04L 51/52* (2022.05);

(Continued)

(58) Field of Classification Search
CPC ..... G06T 11/60; G06T 13/40; G06T 2210/22; G06T 19/006; G06K 9/00255; G06K 9/00248; G06K 9/00281; H04L 51/04; H04L 51/32; H04N 21/2187; H04N 9/8715; H04N 21/4302; H04N 21/44008; H04N 21/47205; H04N 21/8146; G11B 27/036; G06F 3/04845
See application file for complete search history.

(56) References Cited

U.S. PATENT DOCUMENTS 10,726,874 B1 *   7/2020   Smith .................. G11B 27/036
2012/0075496 A1 *  3/2012   Akifusa .................... G06T 5/50
                                                 348/222.1

(Continued)

FOREIGN PATENT DOCUMENTS

WO        2006089140 A2     8/2006

OTHER PUBLICATIONS

P. Garrido, "Automatic Face Reenactment", 2014 IEEE Conf. on Computer Vision and Pattern Recognition, Jun. 23-28, 2014, pp. 4217-4224 (Year: 2014).*

(Continued)

*Primary Examiner* — Jin Cheng Wang
(74) *Attorney, Agent, or Firm* — Georgiy L. Khayet

(57) ABSTRACT

A method is provided that includes displaying, by a computing device, representations of a plurality of stock videos to a user. The representations are at a still image, a partial clip, and/or a full play of the stock video. Each of the representations include a face outline for insertion of a facial image of a user. When the user has provided a self-image to the computing device, the facial image of the user is inserted in the face outline of the representations. The facial image is extracted from the self-image. The method may include receiving a selection of one of the representations of the plurality of stock videos, and displaying a personalized video including a selected stock video with the facial image positioned within a further face outline corresponding to the face outline of the selected representation.

20 Claims, 6 Drawing Sheets

(51) Int. Cl.
*G06F 3/00* (2006.01)
*H04N 5/272* (2006.01)
*G06F 3/04842* (2022.01)
*H04N 5/265* (2006.01)

(52) U.S. Cl.
CPC ............ *H04N 5/265* (2013.01); *H04N 5/272* (2013.01); *H04N 21/4318* (2013.01)

(56) References Cited

U.S. PATENT DOCUMENTS

| | | | |
|---|---|---|---|
| 2014/0112534 A1* | 4/2014 | Sako ...................... | G06V 40/16 382/103 |
| 2018/0012386 A1* | 1/2018 | Kemelmaher ............ | G06T 7/97 |
| 2018/0047200 A1* | 2/2018 | O'Hara .................... | G06T 3/40 |
| 2018/0182144 A1* | 6/2018 | Imoto .................... | H04N 1/387 |
| 2018/0182145 A1* | 6/2018 | Imoto .................... | H04N 1/387 |
| 2018/0205999 A1* | 7/2018 | Garrett .................. | G06T 19/006 |
| 2019/0182563 A1* | 6/2019 | Jung ...................... | G06F 3/167 |
| 2019/0197755 A1* | 6/2019 | Vats ........................ | G06T 13/80 |
| 2020/0169674 A1* | 5/2020 | Hanahara ........... | H04N 5/23219 |
| 2021/0201458 A1* | 7/2021 | Wu ...................... | G06V 40/171 |
| 2021/0312671 A1* | 10/2021 | Liu ...................... | G06V 40/165 |

OTHER PUBLICATIONS kilObit: "JIBJAB—The Best App iOS & Android \!\ 2018", Apr. 28, 2018 (Apr. 28, 2018), pp. 1-3, XP054981970, Retrieved from the Internet: URL: https://www.youtube.com/watch?v=_1VWWYmS2AY, [retrieved on Jun. 25, 2021].

* cited by examiner

PERSONALIZED VIDEOS USING SELFIES AND STOCK VIDEOS

TECHNICAL FIELD

This disclosure generally relates to image and video combinations. More particularly, this disclosure relates to methods and systems for combining a self-image with a stock video.

BACKGROUND

Sharing media, such as stickers and emojis, has become a standard option in messaging applications (also referred herein to as messengers). Currently, some of the messengers provide users with an option for generating and sending images and short videos to other users via a communication chat.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
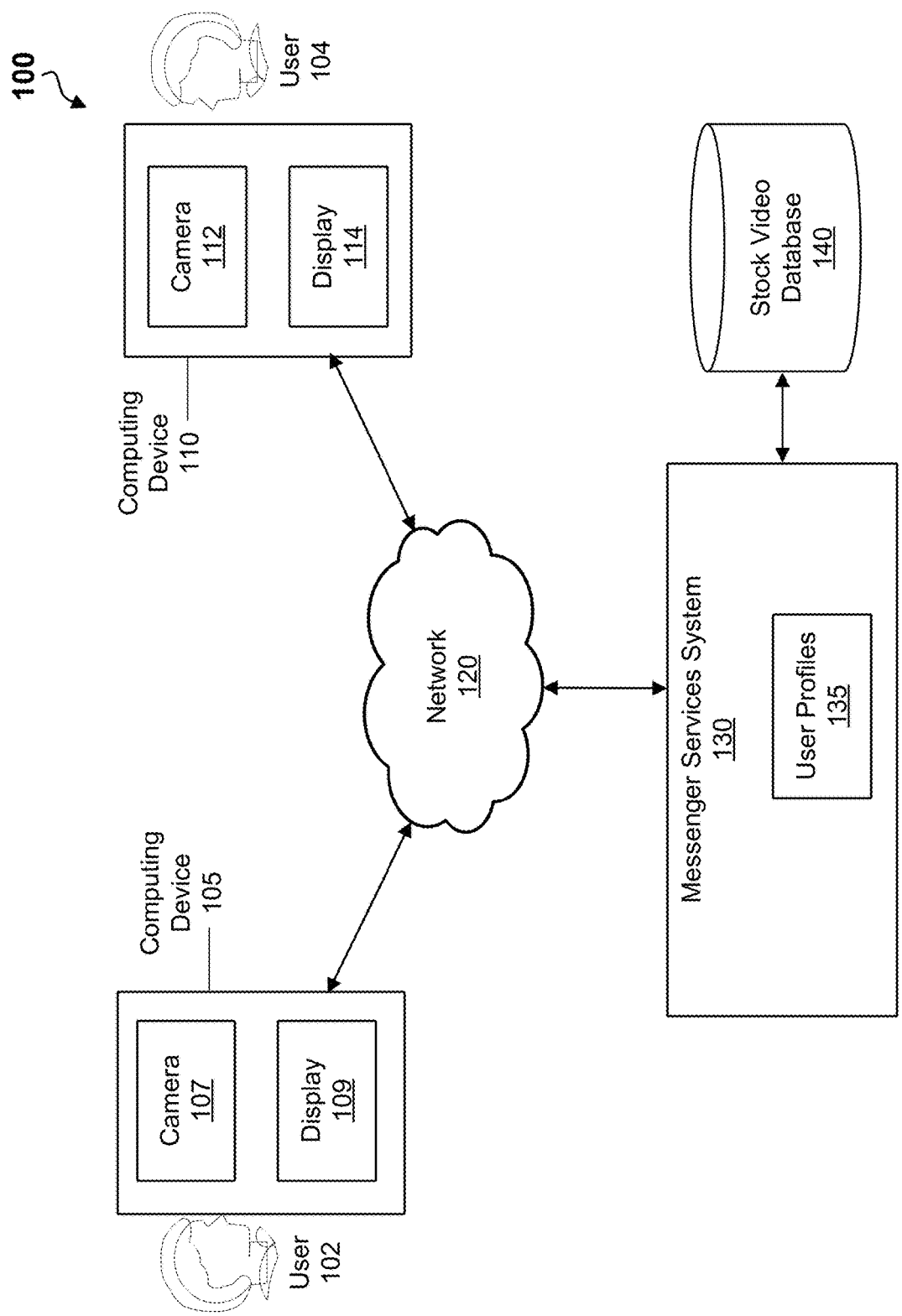
FIG. 1 is a block diagram showing an example environment wherein a system and method for providing personalized videos can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The present technology may enable a mobile device to show a collection of short videos, optionally in webp format, to a user with either a face outline indicating a position for inserting the user's facial image, or with the user's facial image already inserted. The collection may be shown by an image thumbnail, short clips in thumbnail size, or a thumbnail of the full video. The user may select the thumbnail and view a larger version of the personalized video including the user's facial image in the face outline. The user may be prompted to take a selfie if they have not yet saved one in the system. The user may send the personalized video to a contact in a message or for display in the contact's feed. Stock videos may be suggested to the user based on popularity, prior use, or contact's use or reactions. The user may be able to select from different facial images, and may select a selfie from previously taken self-images. The user may be asked to center the face in the selfie within a face outline. If the face is not centered, the user may retake the selfie or may reposition the face or the face outline using a gesture control or a touchscreen motion input to the computing device.

The user may add personalized text overlaying the personalized video and may select both a text message and a text style. The user may add a filter to the personalized video, which may be an animated image overlay, a live-action image overlay, a color shift, or an image quality shift. The stock videos may be uploaded from a database and the user may be able to adjust a costume, a skin tone, a body type, or a gender.

The user and a contact may both authorize multi-person personalized videos, and the faces of both may be inserted into the video. The expressions on the faces may be changed during the personalized video. Users to be included in the personalized video may be suggested based on a user social graph, a recipient/sender of a most recent communication, a most common recipient/sender of communications, or a previous user selection. A contact of the user may authorize the user to use a self-image of the contact sent to the user, and the personalized video may include the contact's face from the other self-image positioned within another face outline in the stock video. A face outline may be presented on a live image of a camera view at a predetermined position in the camera view and with an approximate size of a face of the user when the user is taking the self-image.

Referring now to the drawings, example embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows an example environment 100, wherein a method for providing personalized videos can be practiced. The environment 100 may include a computing device 105, a user 102, a computing device 110, a user 104, a network 120, and messenger services system 130. The computing device 105 and computing device 110 can refer to a mobile device such as a mobile phone, smartphone, or tablet computer. In further embodiments, however, the computing device 110 can refer to a personal computer, laptop computer, netbook, set top box, television device, multimedia device, personal digital assistant, game console, entertainment system, infotainment system, vehicle computer, or any other computing device.

The computing device 105 and the computer device 110 can be communicatively connected to the messenger services system 130 via the network 120. The messenger services system 130 can be implemented as a cloud-based computing resource(s). The messenger services system can include computing resource(s) (hardware and software) available at a remote location and accessible over a network (e.g., the Internet). The cloud-based computing resource(s) can be shared by multiple users and can be dynamically re-allocated based on demand. The cloud-based computing resources can include one or more server farms/clusters including a collection of computer servers which can be co-located with network switches or routers.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, and so forth.

In some embodiments of the disclosure, the computing device 105 can be configured to enable a communication chat between the user 102 and the user 104 of the computing 110. During the communication chat the user 102 and the user 104 may exchange text messages and videos. The videos may include personalized videos. The personalized videos can be generated based on pre-generated videos stored in the computing device 105 or the computing device 110. In some embodiments, the pre-generated videos can be stored in stock video database 140 accessed by the messenger services system 130 and downloaded to the computing device 105 or the computing device 110 on demand.

The messenger services system 130 may be also configured to store user profiles 135. The user profiles 135 may include images of the face of the user 102, images of the face of the user 104, and images of faces of other persons. The user profiles 135 may also store permissions for user 104 to use a face image from user 102, and vice versa. The images of the faces can be downloaded to the computing device 105 or the computing device 110 on demand and based on permissions. Additionally, the images of the face of the user 102 can be generated using camera 107 of the computing device 105 and stored in a local memory of the computing device 105. The images of the faces can be generated based on other images stored in the computing device 105. The images of the faces can be further used by the computing device 105 to generate personalized videos based on the pre-generated videos. The images and the personalized videos may be displayed on display 109 of computing device 105.

Similarly, camera 112 of the computing device 110 may be used to generate images of the face of the user 104. The images of the face of the user 104 can be used to generate personalized videos on the computing device 110. The images and the personalized videos may be displayed on display 114 of computing device 110, either in a message form user 102 or in a content feed of user 104. In further embodiments, the images of the face of user 102 and images of the face of the user 104 can be mutually used to generate personalized videos on the computing device 105 or the computing device 110. For example, user 102 may use their own self-image and a self-image of user 104 that has been communicated to computing device 105 via messenger services system 130 from computing device 110.

Permissions for user 102 to user the self-image of user 104 may be collected and stored in user profiles 135. User 102 may operate computing device 105 to upload a stock video from stock video database 135. The uploaded stock video may be a two person video having face outlines for two people. User 102 may select which self-image is used for which character or position in the stock video. Additionally, personalized videos with more than two persons may be created. Messenger services system 130 may also suggest to user 102 other users to be included in a two or more person personalized video. The other users may be suggested based on a user social graph, a recipient/sender of a most recent communication, a most common recipient/sender of communications, a previous selection by the user, or a manual user selection.

Figure 2:
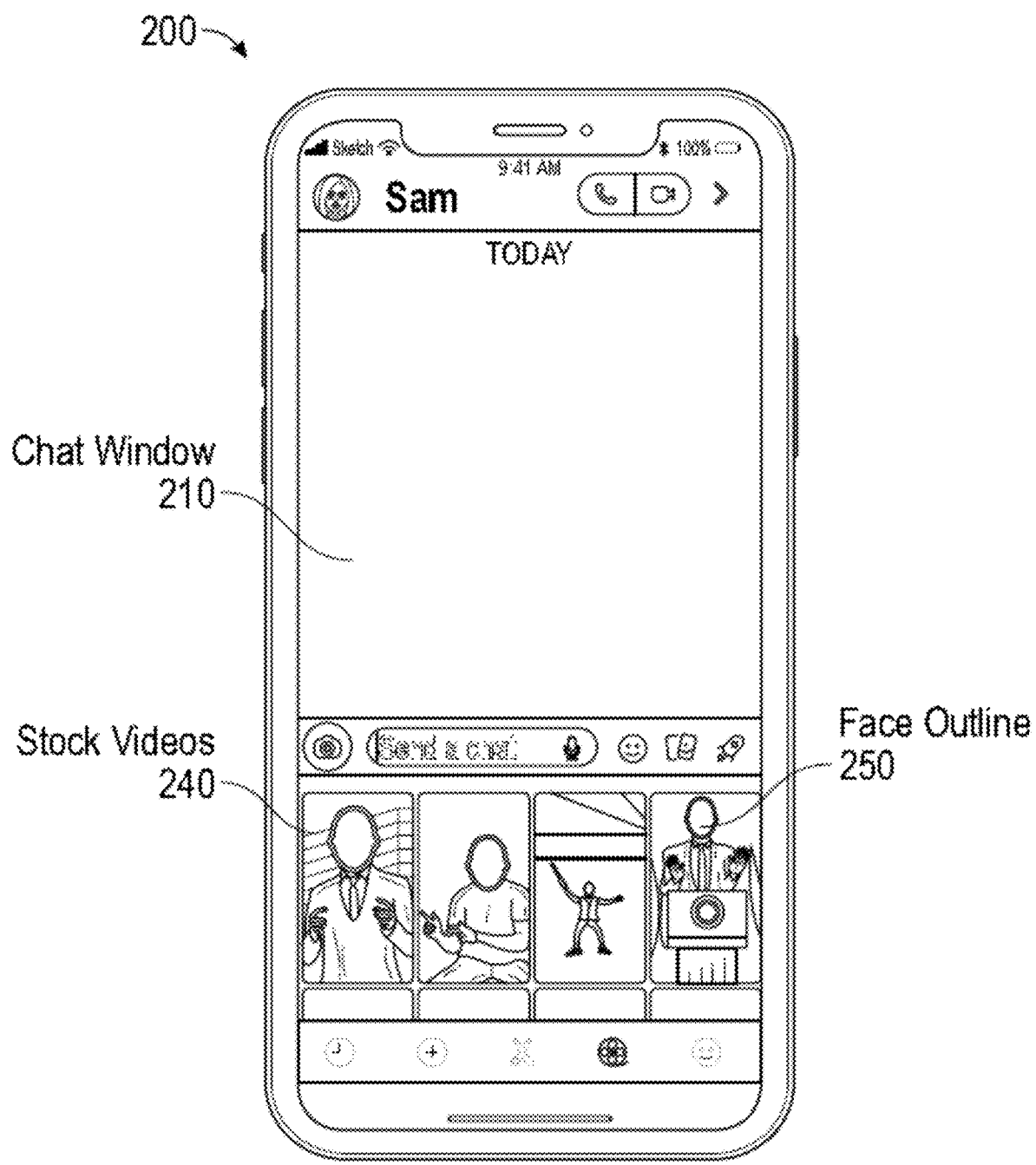
FIG. 2 is a screen of a user interface of a system for providing personalized videos in a messenger, according to some example embodiments.

FIG. 2 shows an example screen of a user interface 200 of a system for providing personalized videos in a messaging application (also referred to as a messenger) or a content feed, according to some example embodiments. User interface 200 may be the display 109 of the computing device 105. The user interface 200 may include a chat window 210 and a section containing representations of stock videos 240. The representations of stock videos 240 may include pre-rendered videos with face outline 250 instead of faces. The pre-rendered videos may include teaser videos intended to show the user a sample representation of how the personalized video may look. The face outline 250 may be shown in the form of white ovals. In some embodiments, the representations of stock videos 240 may include several face outlines 250 to enable creation of multiple-person videos (i.e., videos having faces of multiple persons). Additionally or alternatively, the representations of stock videos 240 may include a face image of the user in the position of face outline 250, and/or a face image of a contact of the user when additional face outlines 250 are present.

The representations of stock videos 240 may be a still image, a partial clip, and/or a full play of the stock video. A user may tap on any of the representations of stock videos 240 to select an associated stock video for modifying and sending to the chat window 210. The modification may include receiving a selfie picture from the user (i.e., an image of a user face taken via a front camera of the computing device), obtaining a source face from the selfie picture, and modifying the selected stock video by inserting the source face into a face outline of the stock video corresponding to the face outline 250 of the representation of the selected stock video.

The personalized video may be generated in the form of an audiovisual media (e.g., a video, an animation, or any other type of media) that features a face of a user. The modified video can be sent to the chat window 210, from which a user may view the personalized video and/or send the personalized video to another user's computing device.

Additionally or alternatively, the user may publish the personalized video to a content feed of the user which may be accessible by contacts of the user or which may be published to the content feed of the user's contacts. Some or all of the representations of stock videos 240 may be associated with stock videos that form a narrative by combining two or more stock videos to be viewed in succession. When a user selects a representation of a stock video 240 that forms a narrative, the two or more associated stock videos may be personalized and displayed to the user in chat window 210, and may be available to be sent to a contact by the message system or through a content feed, either in combination or singly.

The representations of stock videos 240 may include markers or indicators, or an order of presentation, indicating a suggestion by the system of possible preferred stock videos. The system may identify preferred stock videos based on a trending status of the stock video; a reaction by a contact to the stock video; and/or a past usage by the user or the contact of the stock video.

Figure 3:
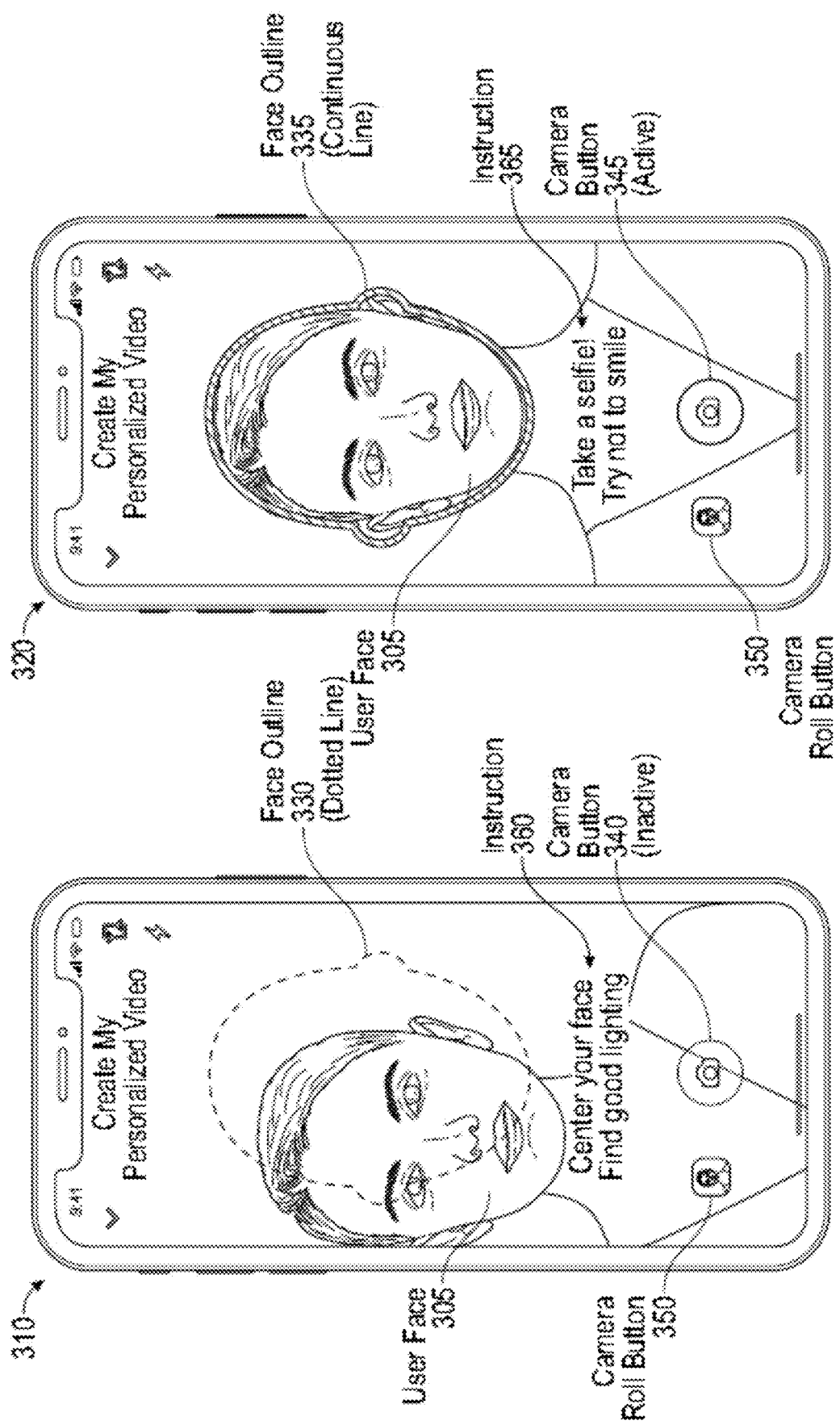
FIG. 3 is a screen of a user interface of a system for providing taking a self-image for use in a personalized videos, according to some example embodiments.

FIG. 3 shows an example screen of user interfaces 310 and 320 of a system for providing personalized videos in a messenger, according to some example embodiments. The user interfaces 310 and 320 show a selfie capturing mode in which a user may take an image of the user face, which is then used as a source face (also referred to as a selfie and a self-image). The user interface 310 shows a live view of a camera of a computing device when the user intends to capture the selfie image. The live view may show the user facial image 305, face outline 330 (also referred to as a selfie oval or a selfie face outline), and a camera button 340. In an example embodiment, the camera button 340 may slide up from a bottom of the screen in the selfie capturing mode.

The user may need to change the position of the camera in order to position the user facial image 305 within the boundaries of the face outline 330. When the user facial image 305 is not centered in the face outline 330, the face outline 330 can be styled in the form of a dotted line and the camera button 340 may be semi-transparent and not actionable to indicate that the camera button 340 is inactive. To notify the user that the user facial image 305 is not centered, an instruction 360 may be displayed on user interface 310. The instruction 360 may include instructions for the user, such as, e.g., "Center your face," "Find good lighting," "Try not to smile," and so forth.

The user interface 320 shows a live view of the camera of the computing device after the user changes the position of the camera to capture the selfie image and the user facial image 305 becomes centered in a face outline 335. In particular, when the user facial image 305 becomes centered in the face outline 335, the face outline 335 changes to become a bold continuous line and the camera button 345 becomes opaque and actionable to indicate that the camera button 345 is now active. To notify the user, an instruction 365 may be displayed on user interface 320. The instruction 365 may instruct the user to make the selfie picture, such as, e.g., "Take a selfie," "Try not to smile," and so forth. The user interface 320 may display a smile measurement, which may assist a user in reducing, increasing, or eliminating their smile by indicating a measurement relative to a target smile level.

In some embodiments, the user may select an existing selfie picture from a picture gallery by accessing a camera roll. The user may manually identify the face in a previously taken selfie by adjusting the position of a face outline or by adjusting the position of the photo with the face outline being fixed. Additionally, the system may identify the face for the user. Inputs for moving the face or the face outline may be made by touchscreen activation or gesture control.

Figure 4:
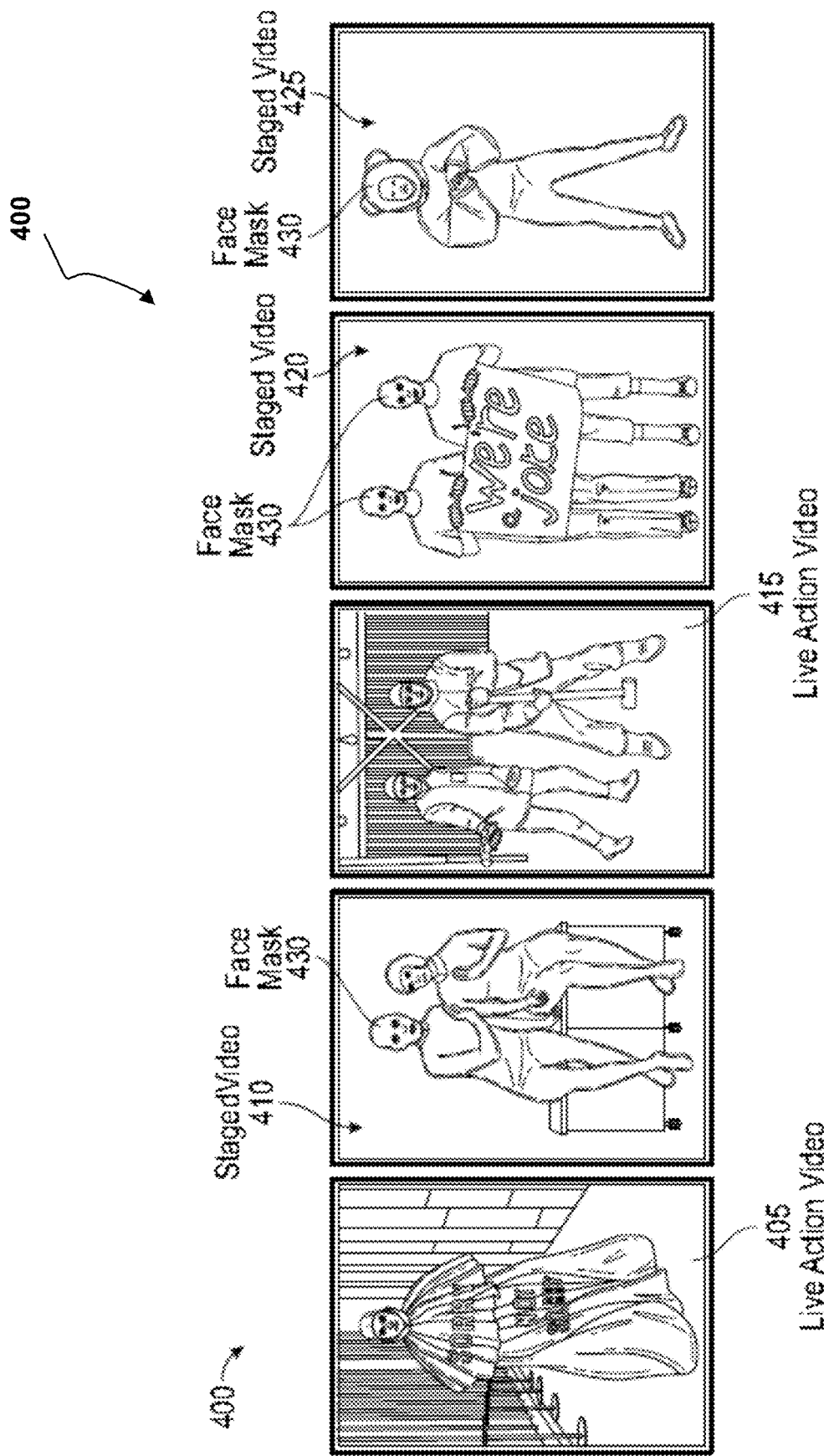
FIG. 4 shows frames of example live action videos for generating video templates, according to some example embodiments.

FIG. 4 shows frames of example stock videos for generating video templates, which may subsequently be used to create personalize videos. Stock videos may be created using live action videos 405 and 415 recorded at a real life location, or may be staged videos 410, 420, and 425, recorded in front of a screen. Staged videos 410, 420, and 425 may have an alternative background inserted at a later time (for example, by the messenger service or by a user). The actors in the staged videos 410, 420, and 425, may wear face masks 430 to facilitate the positioning of a user's face on the body of the actor in the personalized video. Additionally, the actors in the live action videos 405 and 415 may also wear face masks to facilitate the positioning of a user's face on the body of the actor in the personalized video. Face masks 430 of live action videos 405 and 415 and staged videos 410, 420, and 425 may correspond to the face outlines 250 in the representations of stock videos in FIG. 2.

In some exemplary embodiments, the image of an actor in a stock video may be adjusted by the user or the user's computing device. For example, the image of the actor may be adjusted to change their body type (for example heavier, lighter, taller or shorter), which may be done to match the user or for any other reason. Additionally or alternatively, the skin tone of the image of the actor in the stock video may be adjusted to match the user. The skin tone adjustment may be automatic or manually performed by the user. Likewise, a gender of the actor in the stock video may be adjusted to match the user or for any other reason. Additionally, the user may be able to change a costume of a character in the stock video. The facial image of the user may be modified in the personalized video to change an expression.

Staged video 420 includes two face masks 430 marking areas for insertion of two facial images. One of the facial images may be the user, and the other may be a contact that is selectable by the user. The user may select which of the two face masks 430 is replaced by the user's facial image and which is replaced by the contact's facial image, or alternatively, the system may automatically position the user's and the contact's facial images. The contact's facial image may be taken by computing device 110 and then transmitted to computing device 105, along with an authorization to use the facial image by the user. The user's facial image may be taken by computing device 105 and then transmitted to computing device 110, along with an authorization to use the facial image by the contact. Staged video 420 may also include more than two face masks 430, and more than one contact may be included in the personalized video with the user.

Alternatively, the user may have a library of source faces from various self-images to select from for modifying live action videos 405 and 415 and/or staged videos 410, 420, and 425. A user may additionally be able to add personalized text overlaying the personalized video, including a text message and/or a text style. The user may also add filters to the personalized video, for instance an animated image overlay, a live-action image overlay, a color shift, and/or an image quality shift.

Figure 5:
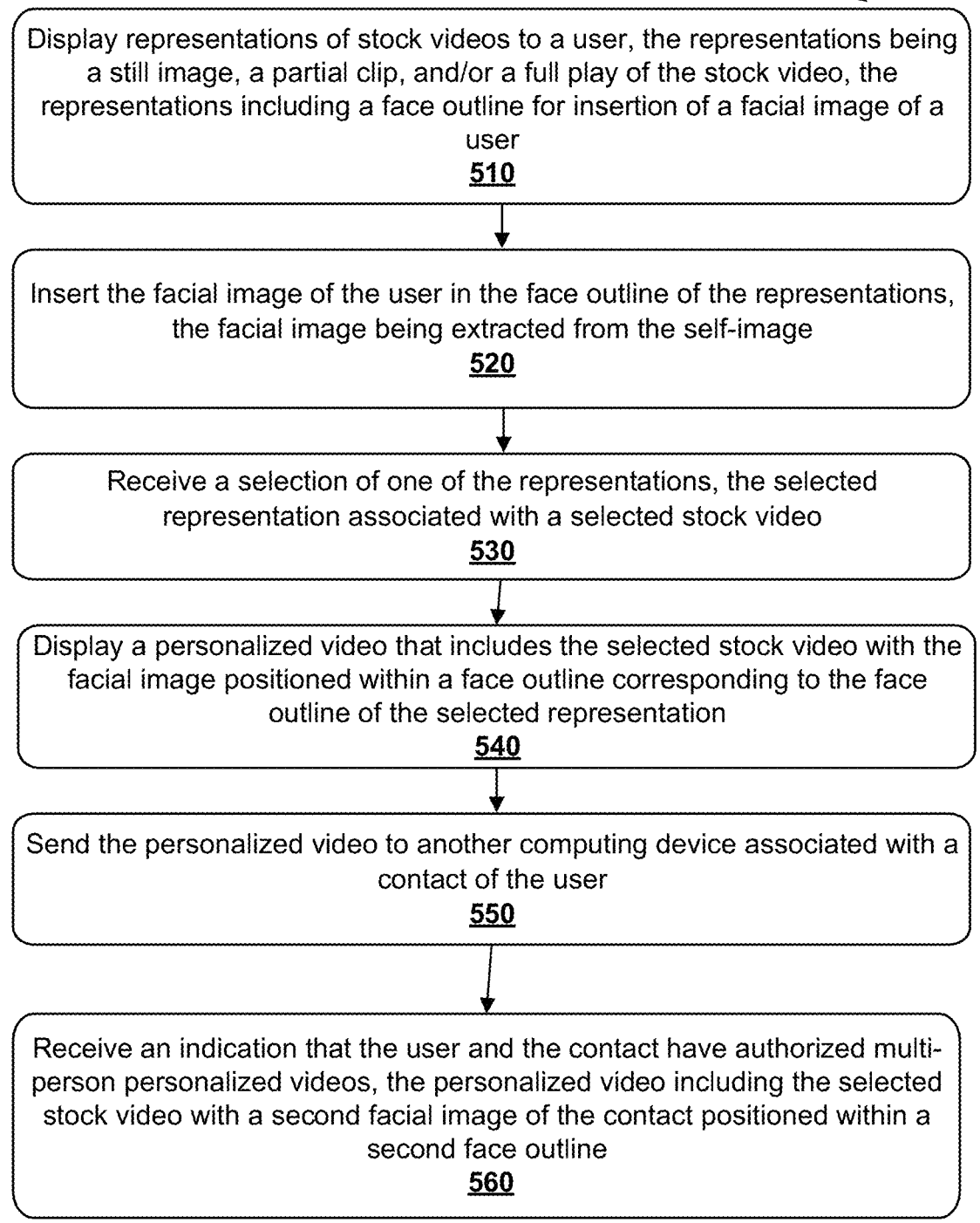
FIG. 5 is a flow chart showing a method for preparing stock videos and setting up self-images for combining with the stock videos to create a personalized video, in accordance with an example embodiment.

FIG. 5 is a flow chart showing a method 500, which may be utilized in a messaging system adapted to send and receive modifiable videos including a self-image of a user. In method 500, the indicated steps may be optional and/or performed in any particular order. The flow in method 500 starts at operation 510, which indicates to display representations of stock videos to a user. The representations may be a still image, a partial clip, and/or a full play of the stock video, and may include a face outline for insertion of a facial image of a user. From operation 510, the flow proceeds to operation 520, which indicates to insert the facial image of the user in the face outline of the representations.

The facial image is extracted from the self-image. From operation 520, the flow proceeds to operation 530, which indicates to receive a selection of one of the representations. The selected representation is associated with a selected stock video. From operation 530, the flow proceeds to operation 540, which indicates to display a personalized video that includes the selected stock video with the facial image positioned within a face outline corresponding to the face outline of the selected representation. From operation 540, the flow proceeds to operation 550, which indicates to send the personalized video to another computing device associated with a contact of the user. From operation 550, the flow proceeds to operation 560, which indicates to receive an indication that the user and the contact have authorized multi-person personalized videos. The personalized video includes the selected stock video with a second facial image of the contact positioned within a second face outline. Some or all of the steps in method 500 may be performed by the computing device 105.

Figure 6:
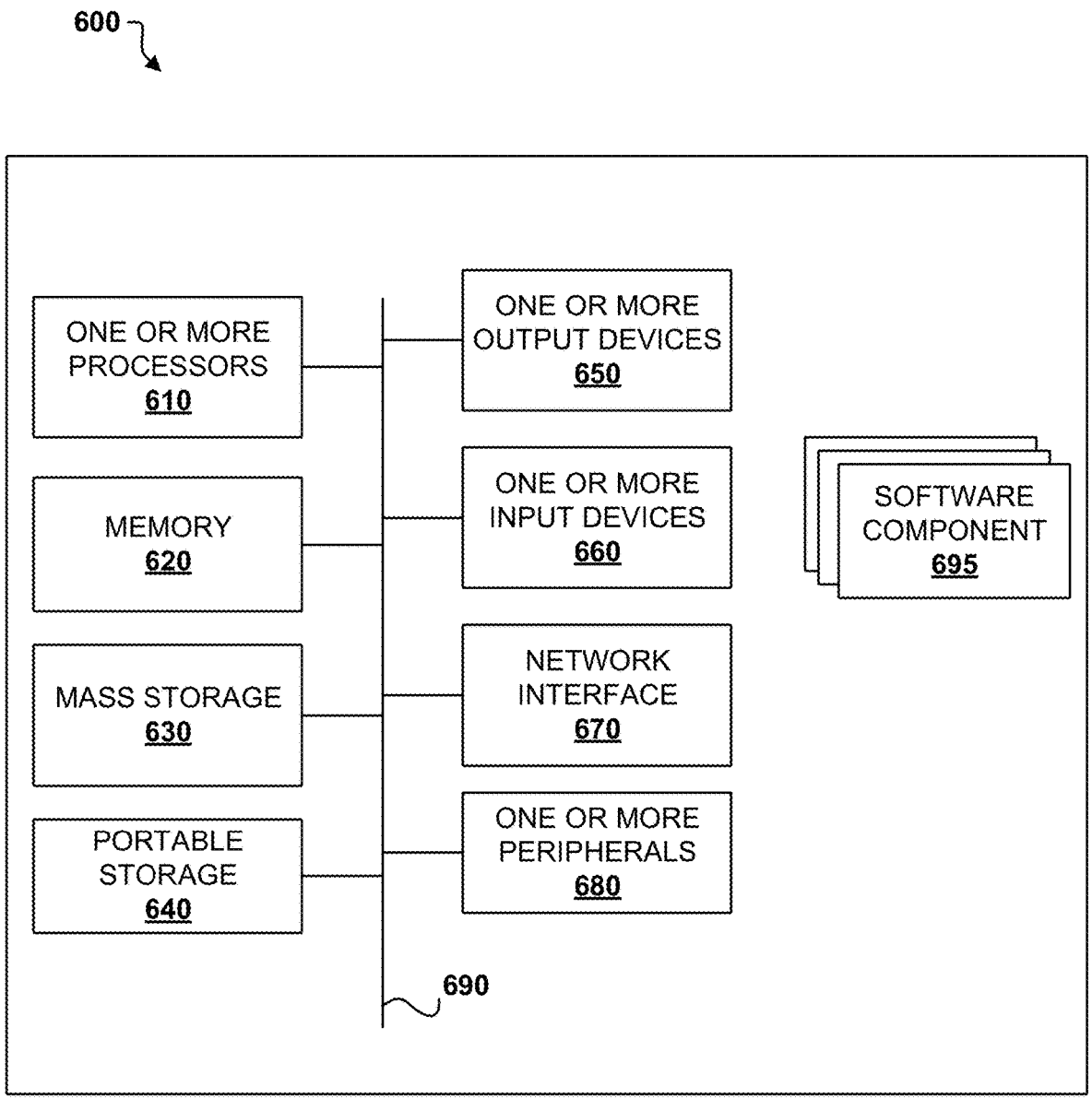
FIG. 6 shows an example computer system that can be used to implement methods for providing personalized videos.

FIG. 6 illustrates an example computing system 600 that can be used to implement methods described herein. The computing system 600 can be implemented in the contexts of the likes of computing devices 105 and 110, the messenger services system 130, the messenger 220, to drive user interfaces 310 and 320, or to perform method 500 for providing personalized videos.

As shown in FIG. 6, the hardware components of the computing system 600 may include one or more processors 610 and memory 620. Memory 620 stores, in part, instructions and data for execution by processor 610. Memory 620 can store the executable code when the system 600 is in operation. The system 600 may further include an optional mass storage device 630, optional portable storage medium drive(s) 640, one or more optional output devices 650, one or more optional input devices 660, an optional network interface 670, and one or more optional peripheral devices 680. The computing system 600 can also include one or more software components 695 (e.g., ones that can implement the method for providing personalized videos as described herein).

The components shown in FIG. 6 are depicted as being connected via a single bus 690. The components may be connected through one or more data transport means or data network. The processor 610 and memory 620 may be connected via a local microprocessor bus, and the mass storage device 630, peripheral device(s) 680, portable storage device 640, and network interface 670 may be connected via one or more input/output (I/O) buses.

The mass storage device 630, which may be implemented with a magnetic disk drive, solid-state disk drive, or an optical disk drive, is a non-volatile storage device for storing data and instructions for use by the processor 610. Mass storage device 630 can store the system software (e.g., software components 695) for implementing embodiments described herein.

Portable storage medium drive(s) 640 operates in conjunction with a portable non-volatile storage medium, such as a compact disk (CD) or digital video disc (DVD), to input and output data and code to and from the computing system 600. The system software (e.g., software components 695) for implementing embodiments described herein may be stored on such a portable medium and input to the computing system 600 via the portable storage medium drive(s) 640.

The optional input devices 660 provide a portion of a user interface. The input devices 660 may include an alphanumeric keypad, such as a keyboard, for inputting alphanumeric and other information, or a pointing device, such as a mouse, a trackball, a stylus, or cursor direction keys. The input devices 660 can also include a camera or scanner. Additionally, the system 600 as shown in FIG. 6 includes optional output devices 650. Suitable output devices include speakers, printers, network interfaces, and monitors.

The network interface 670 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 670 may be a network interface card, such as an Ethernet card, optical transceiver, radio frequency transceiver, or any other type of device that can send and receive information. The optional peripherals 680 may include any type of computer support device to add additional functionality to the computer system.

The components contained in the computing system 600 are intended to represent a broad category of computer components. Thus, the computing system 600 can be a server, personal computer, hand-held computing device, telephone, mobile computing device, workstation, minicomputer, mainframe computer, network node, or any other computing device. The computing system 600 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for providing personalized videos using selfies and stock videos have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method comprising:
displaying, by a computing device, representations of a plurality of stock videos to a user, the representations being at least one of a still image, a partial clip, and a full play of the stock video, each of the representations including a face outline for insertion of a facial image of the user, the face outline being pre-rendered to obscure a face in the representations and being displayed in a form of an oval solidly filled with a pre-determined color;
inserting, when the user has provided a self-image to the computing device, the facial image of the user in the face outline of the representations, the facial image being extracted from the self-image;
receiving, by the computing device, a selection of one of the representations of the plurality of stock videos, the selected representation being associated with a selected stock video including a further face outline corresponding to the face outline of the selected representation;
displaying, by the computing device, a personalized video including the selected stock video with the facial image positioned within the further face outline;
determining, by the computing device, that the selected stock video is associated with a further stock video to be viewed in succession with the selected stock video to form a narrative, the further stock video including a yet further face outline; and
in response to the determination:
inserting the facial image of the user into the yet further face outline to generate a second personalized video including the further stock video with the facial image of the user positioned within the yet further face outline; and
displaying, by the computing device, the second personalized video sequentially to the personalized video.

2. The method of claim 1, wherein:
the personalized video and the second personalized video are displayed sequentially to form the narrative.

3. The method of claim 1, further comprising:
sending, by the computing device, the personalized video to another computing device, the other computing device being associated with a contact of the user;
wherein the facial image in the personalized video is modified to include an expression change from the facial image extracted from the self-image.

4. The method of claim 3, wherein:
the selected stock video includes a second face outline for insertion of a second facial image from the contact;
the personalized video includes the selected stock video with the second facial image positioned within the second face outline, the second facial image being extracted from a second self-image of the contact;
the user has authorized use of the facial image of the user in multi-person personalized videos; and
the contact has authorized use of the second facial image of the contact in the multi-person personalized videos.

5. The method of claim 4, further comprising:
receiving, by the computing device from the other computing device, an indication that the contact has authorized use of the second facial image of the contact in the multi-person personalized videos; and
receiving, by the computing device from the other computing device, the second facial image of the contact.

6. The method of claim 3, further comprising presenting to the user, by the computing device, suggested contacts including the contact, the suggested contacts being selected based on at least one of:
a recency of communication between the contact and the user,
a frequency of communication between the contact and the user,
a social graph of the user, and
a manual selection by the user.

7. The method of claim 3, wherein the other computing device receives the personalized video in a message from the user to the contact.

8. The method of claim 3, wherein the other computing device receives the personalized video and publishes the personalized video in a content feed for display to the contact.

9. The method of claim 1, further comprising selecting by the user the facial image from a plurality of facial images of the user.

10. The method of claim 1, further comprising receiving, by the computing device, at least one of:
instructions from the user to add a personalized text overlaying the personalized video, the instructions including at least one of a text message and a text style; and
a request from the user to add a filter to the personalized video, the filter being at least one of an animated image overlay, a live-action image overlay, a color shift, and an image quality shift.

11. The method of claim 1, wherein the displaying of the representations of the plurality of the stock videos to the user includes identifying at least one suggested stock video for the user, the at least one suggested stock video being selected by the computing device from the plurality of the stock videos based on at least one of:
a trending status of the at least one suggested stock video;
a reaction by a contact to the at least one suggested stock video;
a past usage by the contact of the at least one suggested stock video; and
a past usage by the user of the at least one suggested stock video.

12. The method of claim 1, further comprising:
receiving, by the computing device, a request from the user to take the self-image;
displaying, by the computing device, a selfie face outline in a display of a front face camera feed; and
receiving, by the computing device, a capture command from the user when the user is ready to take the self-image and the facial image of the user is centered in the selfie face outline.

13. The method of claim 1, further comprising:
receiving, by the computing device, a selection from the user of the self-image from a plurality of self-images;
wherein the facial image is extracted from the self-image by one of:
the user positioning the facial image within a selfie face outline using one of a gesture control and a touchscreen motion input to the computing device;
the user positioning the selfie face outline around the facial image using one of the gesture control and the touchscreen motion input to the computing device; and
the computing device positioning the facial image within the selfie face outline using a facial recognition module.

14. The method of claim 1, further comprising receiving, by the computing device, a request by the user to at least one of:
- change a costume;
- adjust a skin tone;
- adjust a body type; and
- adjust a gender.

15. The method of claim 1, further comprising publishing, by the computing device, the personalized video to a content feed of the user, the content feed being accessible by one or more contacts of the user.

16. A system comprising at least one processor and a memory storing processor-executable codes, wherein the at least one processor is configured to implement the following operations upon executing the processor-executable codes:
- displaying, by a computing device, representations of a plurality of stock videos to a user, the representations being at least one of a still image, a partial clip, and a full play of the stock video, each of the representations including a face outline for insertion of a facial image of the user, the face outline being pre-rendered to obscure a face in the representations and being displayed in a form of an oval solidly filled with a pre-determined color;
- inserting, when the user has provided a self-image to the computing device, the facial image of the user in the face outline of the representations, the facial image being extracted from the self-image;
- receiving, by the computing device, a selection of one of the representations of the plurality of stock videos, the selected representation being associated with a selected stock video including a further face outline corresponding to the face outline of the selected representation;
- displaying, by the computing device, a personalized video including the selected stock video with the facial image positioned within the further face outline;
- determining, by the computing device, that the selected stock video is associated with a further stock video to be viewed in succession with the selected stock video to form a narrative, the further stock video including a yet further face outline; and
- in response to the determination:
  - inserting the facial image of the user into the yet further face outline to generate a second personalized video including the further stock video with the facial image of the user positioned within the yet further face outline; and
  - displaying, by the computing device, the second personalized video sequentially to the personalized video.

17. The system of claim 6, wherein:
the personalized video and the second personalized video are displayed sequentially to form the narrative.

18. The system of claim 16, wherein the at least one processor is configured to implement the following further operations upon executing the processor-executable codes:
- sending, by the computing device, the personalized video to another computing device, the other computing device being associated with a contact of the user;
- wherein the facial image in the personalized video is modified to include an expression change from the facial image extracted from the self-image.

19. The system of claim 16, wherein the at least one processor is further configured to publish the personalized video to a content feed of the user, the content feed being accessible by one or more contacts of the user.

20. A non-transitory processor-readable medium having instructions stored thereon, which, when executed by one or more processors, cause the one or more processors to implement a method for operating a messaging system adapted to send and receive modifiable videos including a self-image of a user, the method comprising:
- displaying, by a computing device, representations of a plurality of stock videos to the user, the representations being at least one of a still image, a partial clip, and a full play of the stock video, each of the representations including a face outline for insertion of a facial image of the user, the face outline being pre-rendered to obscure a face in the representations and being displayed in a form of an oval solidly filled with a pre-determined color;
- inserting, when the user has provided the self-image to the computing device, the facial image of the user in the face outline of the representations, the facial image being extracted from the self-image;
- receiving, by the computing device, a selection of one of the representations of the plurality of stock videos, the selected representation being associated with a selected stock video including a further face outline corresponding to the face outline of the selected representation;
- displaying, by the computing device, a personalized video including the selected stock video with the facial image positioned within the further face outline;
- determining, by the computing device, that the selected stock video is associated with a further stock video to be viewed in succession with the selected stock video to form a narrative, the further stock video including a yet further face outline; and
- in response to the determination:
  - inserting the facial image of the user into the yet further face outline to generate a second personalized video including the further stock video with the facial image of the user positioned within the yet further face outline; and
  - displaying, by the computing device, the second personalized video sequentially to the personalized video.

* * * * *